April 29, 1952 — L. NIXON — 2,594,484

REELING DEVICE

Filed Aug. 10, 1948 — 2 SHEETS—SHEET 1

INVENTOR
LEROY NIXON
BY
ATTORNEY

April 29, 1952     L. NIXON     2,594,484
REELING DEVICE

Filed Aug. 10, 1948     2 SHEETS—SHEET 2

INVENTOR
LEROY NIXON
BY
W. Philip Churchill
ATTORNEY

Patented Apr. 29, 1952

2,594,484

UNITED STATES PATENT OFFICE 2,594,484

REELING DEVICE

Leroy Nixon, Newtown, Pa., assignor to John A. Roebling's Sons Company, Trenton, N. J., a corporation of New Jersey Application August 10, 1948, Serial No. 43,440

12 Claims. (Cl. 254—160)

This invention relates to a reel for paying out or reeling in a line, cord, rope or the like, and more particularly to a spring operated rewinding reel which has one or more pneumatic brakes to control the rate at which the line is paid out, or reeled in, or both.

Many different types of reels have been suggested or used for supporting or lowering various articles, such as hatch covers, fire-escapes or the like, or for towing various things, such as gliders, boats, or skiers on ski tows. Usually in these and other uses, the reel is provided with a spring which is tightened or coiled as the line is paid out, and thus serves to reel in the line again when the tension on it is released. For many such purposes it is desirable to provide a reel which prevents the line from being paid out too fast, and for other purposes it is desirable to provide a reel which prevents the line from being rewound too rapidly. For still other uses, such as in ski tows, it is desirable to provide a reel which controls independently both the rate at which the line is paid out and the speed of rewinding.

It is an object of my invention to provide a reeling device which is compact in structure and which may be adjusted to resist with any desired degree of force a rapid paying out of the line, or which may be adjusted to prevent too rapid reeling in of the line, or both.

Another object of my invention is the provision of a reeling device in which the rate of rotation of the drum on which a line is wound is automatically checked by a pneumatic brake constructed as a part of the reel.

It is a further object of this invention to provide such a device which has a fleeting motion as the line is paid out or reeled in so that the line will be wound up smoothly and evenly on the reel drum.

A preferred form of reel constructed in accordance with my invention is shown in the accompanying drawings, in which Fig. 1 is a vertical longitudinal sectional view of a reel supported on a hanger attached to a traveling overhead rope or cable.

Figure 1:
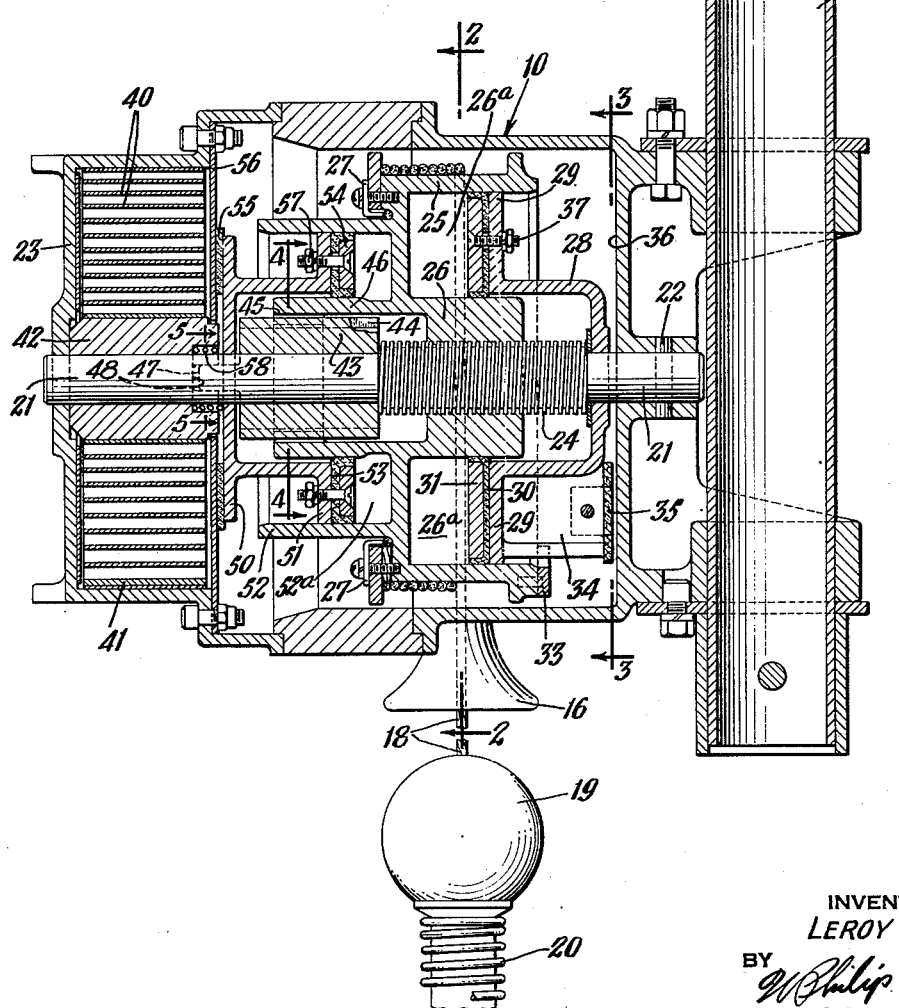
Figure 4:
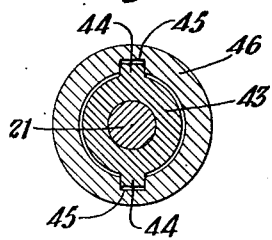
Figure 5:
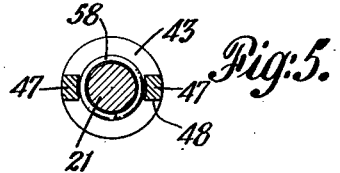

Figs. 4 and 5 are transverse sectional views of details of construction, taken respectively on the lines 4—4 and 5—5 of Fig. 1.

The preferred embodiment of my invention illustrated in the drawings includes provision for preventing both too rapid unwinding as well as a too rapid rewinding of the reel drum as the line is paid out or reeled in. The device is also illustrated as a part of a ski tow, although it will be understood that the reeling device itself could be used as an overhead support for tools used by workers on an assembly line, for supporting various other movable articles, or for other towing uses.

Referring more particularly to the drawings, numeral 10 indicates a housing for the reel which is bolted or otherwise secured to a hanger 11, the hanger in turn being rotatably attached to the arm 12 of a grip 13 clamped to an overhead tow rope 14. By way of example, the tow rope 14 may be a constantly moving overhead fiber or wire rope such as is used in an aerial tramway and is supported at suitable intervals by sheaves, one of which is shown at 15.

Figure 2:
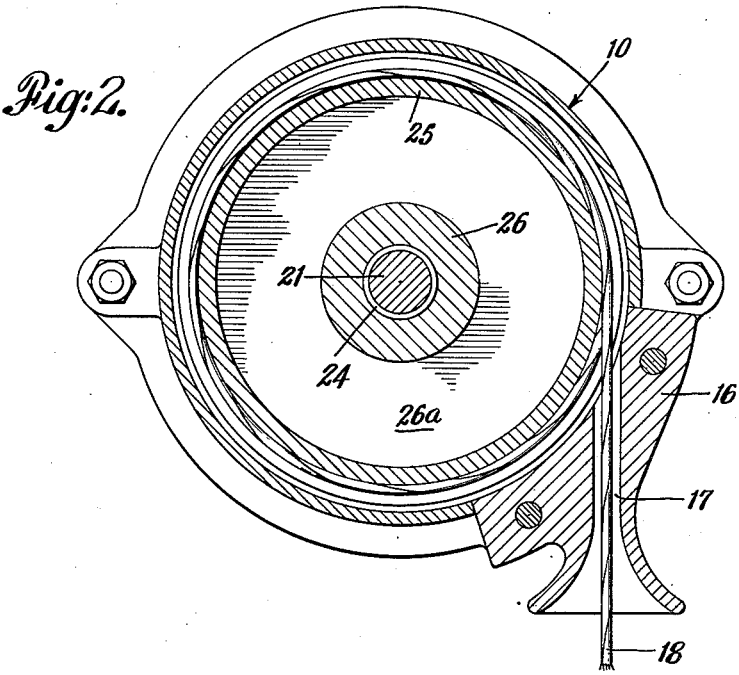
Fig. 2 is a transverse vertical sectional view of the device, taken about on the line 2—2 of Fig. 1.

The housing 10 may be provided with a removable guide section 16 having a central flared opening 17 (see Fig. 2) through which a line 18 is paid out or reeled in. The line 18 may be wire rope, fiber rope or any other suitable flexible cord or cable material. As illustrated, it is a small diameter flexible wire rope having its outer end fixed to a rubber ball 19 adapted to strike the end of the guide section 16 to limit the extent to which the line can be reeled in. When the device is used as a tow line on a ski tow, a jay stick, T-bar, or other suitable support for the skier may be attached directly to the rubber ball 19, with an intermediate coil spring 20 to take up any unusual sudden shock.

The housing 10 is provided centrally with a shaft 21 fixed to the housing by the pin 22 at one end and supported at its other end by the housing cover 23. This fixed shaft is generally smooth but has one intermediate section provided with threads 24. Mounted for rotation on the threads 24 of the shaft 21 is a drum 25 having an internally threaded hub portion 26, so that the drum 25 moves in an axial direction one way or the other as it rotates about the shaft 21. This makes it possible to give the drum a fleeting motion with respect to the guide opening 17, so that as the line 18 is paid out or reeled in, it is unwound or wound up smoothly without bunching on the drum. The innermost end of the line 18 may be securely fixed to the drum by the clamps 27, 27.

Figure 3:
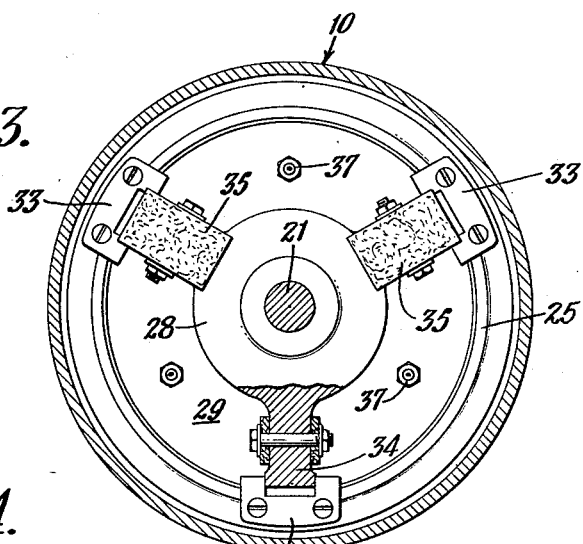
Fig. 3 is a similar transverse sectional view of the device, taken about on the line 3—3 of Fig. 1.

A spider 28 is supported for rotation on a smooth portion of the shaft 21 near one end of the threads 24, and has an annular outwardly extending flange 29 fitting more or less snugly in the annular pocket 26a formed between the outer wall of the drum 25 and its hub 26. Flange 29 is preferably provided with a packing or gasket member 30 clamped in place by the plate 31. The flange 29 and its packing 30 thus act as a piston in the movable pocket 26a, which serves as a cylinder. Spider 28 is rotated with the drum 25 by means of three slotted plates 33 which are fixed to the drum and engage loosely the three radial arms 34 of the spider 28 (see Fig. 3). The radial arms 34 of spider 28 are also provided with brake shoes faced with leather, rubber or other suitable friction material 35 adapted to be pressed against the stationary inner surface 36 of the housing 10.

Thus, the spider 28 is rotated by the drum 25 but is prevented from substantial axial movement so that when the drum 25 moves in an axial direction to the right as seen in Fig. 1, air is compressed in the pocket 26a and presses the rotating brake shoes 35 against the stationary braking surface 36. The amount of braking pressure generated depends on the speed of rotation of drum 25, and can readily be controlled by an adjustable vent 37, which can be set to bleed off the compressed air from the pocket 26a at any desired rate.

Inside the cover plate 23 (Fig. 1) there is mounted a coil spring 40, the outer end of which is fixed to the cover plate as at 41, in any suitable manner, and the inner end of which is fixed to the spool 42 rotatably mounted on the shaft 21. Between the spool 42 and the threads 24, a separate drive sleeve 43 is also rotatably mounted on the shaft 21 and provided with longitudinal keys 44 on its outer surface. The longitudinal keyways 45 (Figs. 1 and 4) formed in the inner surface of the annular flange 46 extending from the hub 26 are adapted to engage and slide on these keys 44. In this manner, the sleeve 43 is rotated by the drum 25. Sleeve 43 is also provided with tongues 47 (Figs. 1 and 5) which project from one end of the sleeve into slots 48 in the spool 42 and thus serve to rotate the spool 42 with the sleeve 43 and the drum 25. In this manner, the coil spring 40 is coiled or wound up as the line 18 is paid off by the drum 25. When the outer end of line 18 is released, the wound up coil spring 40 serves to rewind the line by rotating the sleeve 43 and drum 25.

The tongues 47 on sleeve 43 also pass through slots in and thereby drive or rotate the spider 50 (Fig. 1) which has an annular flange 51 extending into another annular pocket 52a formed between the annular flanges 46 and 52 of the drum 25. The flange 51 may be provided with suitable leather or other packing or gasket material 53, clamped in place by the plate 54. Spider 50 also carries brake shoes 55 which are arranged to bear against the stationary plate 56 secured by bolts or other suitable means to the cover plate 23 to complete the housing for the coil spring 40.

The flange 51 with its packing 53 acts as a piston in pocket 52a which serves as a cylinder. In this manner, the brake shoes 55 are pressed against the braking surface 56 when the drum 25 rewinds the line 18 and moves axially to the left as seen in Fig. 1, thereby compressing air in the pocket 52a. An adjustable air vent 57 may be provided in the flange 51 to release this compressed air at any desired rate.

If desired, a small coil spring 58 may be mounted in a pocket cut out of one end of the spool 42, and surrounding the shaft 21, to urge the spider 50 away from the braking surface 56 when the brake shoes 55 are not pressed against this surface by compressed air in the pocket 52a.

In the operation of the device when employed as part of a ski tow, a series of the reels in their housings 10 are clamped at intervals to the overhead tow rope 14 which is moved along at a constant and fixed rate of speed. At the bottom of the tow, the skier, or an attendant, grasps the rubber ball 19 to pull out the line 18 and enable the skier to adjust the T-stick or other support on his person for towing. At this time, the skier is stationary while the tow rope 14 is moving. As the line 18 begins to pay out, there is very little resistance offered by the drum 25, the resistance being only that produced by winding up the coil spring 40. With most reels, the line is frequently all paid out before the skier begins to move at anything approaching the speed of the tow rope so that as the last of the line comes off the reel, the skier is suddenly started with a severe yank.

However, with the reel of my invention, air is compressed in the pocket 26a as the drum 25 begins to pay out the line 18 by reason of the axial movement of the drum 25 to the right as seen in Fig. 1. The compressed air in pocket 26a in turn serves to press the brake shoes 35, which rotate with the spider 28 and drum 25, against the stationary braking surface 36. Spider 28 may be made and supported so that it is permitted a certain amount of axial movement before the shoes 35 come in contact with the braking surface 36, thus allowing the line 18 to be pulled out quickly and easily for a short distance before the brake shoes 35 become effective.

As the brake shoes 35 are pressed against the braking surface 36, the friction generated by them retards the rate at which the line 18 is paid out by drum 25 and thus starts the skier moving smoothly and gradually before the entire amount of the line 18 is paid out by the reel. It will be apparent that the faster the line 18 is pulled out, the more compression will be obtained in the pocket 26a, and consequently, the greater will be the pressure on the brake shoes 35 which resists rotation of the drum 25.

Such a pneumatic device can readily be adjusted by means of the vent 37 to provide as much or as little brake shoe pressure as is desired. The action of the reel, however, is to cushion or gradually increase the pull which is exerted on the skier, thus starting him to move gently and without an abrupt jerk, and this increasing pull is continued until the skier reaches the forward speed of the tow rope 14.

When the skier arrives at the top of the tow, or for some other reason, releases the line 18, it is rewound automatically on the reel by the coil spring 40. With most reels, the line 18 would be rapidly pulled in at an accelerated speed until the ball 19 was suddenly stopped by the guard 16, or it would be whipped back and forth several times before coming to rest against the guard 16. To avoid this action, which may be dangerous as well as objectionable, the drum 25 as it reels in the line 18 moves axially to the left as seen in Fig. 1, thus compressing air between the flange 51 and the drum flanges 46 and 52 which serves to press the brake shoes 55 against the braking surface 56. The amount of pressure may, of course, be adjusted ahead of time by appropriate setting of the vent 57. In any event, the pneumatic brake operates both when the line is paid out or reeled in to cushion or resist too rapid a movement of the line 18, and the amount of braking action dependent on the speed of movement of the line 18.

It will be apparent to those skilled in the art that the utility of this device is not limited to its use in connection with ski tows. It may be useful in various other towing apparatus, or it may be used for supporting various articles, such as work tools used from time to time by workers on an assembly line. Also, it will be apparent that my compact arrangement for a pneumatic brake on such a reel may be employed simply to serve as a brake during paying out of the line and not when it is reeled in, or it may be used as a brake only when the line is reeled in and not when it is paid out. In other words, the spider 28 may be omitted from the structure, or the spider 50 may be omitted from the structure, depending upon the need for the braking action for paying or reeling in the line. For example, in supporting a work tool the brake may be more important in reeling in than paying out, whereas in certain towing operations, the reverse may be true.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A reeling device which comprises a rotatable drum for paying out and reeling in a line, a spring urging said drum to reel in the line, a brake shoe rotated by the drum, a stationary surface positioned adjacent said brake shoe, and pneumatic means between said drum and brake shoe operated by rotation of said drum to press said brake shoe against said surface.

2. A reeling device which comprises a rotatable drum for paying out and reeling in a line, a spring urging said drum to reel in the line, a brake shoe connected to said drum and arranged to be pressed against a braking surface to resist rotation of said drum, and an air chamber between said drum and said brake shoe in which air is compressed to force said shoe against said surface, said drum and brake shoe having relative axial motion to compress air in said chamber as the drum is rotated.

3. A reeling device having a drum for paying out a line which is rotatably mounted on a threaded shaft so that the drum moves axially of the shaft as it rotates, a brake shoe rotated by the drum and acting on a braking surface to retard rotation of said drum, and a chamber in which air is compressed by axial movement of said drum to press said shoe against said surface.

4. A reeling device having a drum for paying out a line which is rotatably mounted on a threaded shaft so that the drum moves axially of the shaft as it rotates, a spring for rewinding up the line on said drum, a brake shoe acting on a braking surface to retard rotation of said drum, and a chamber in which air is compressed by axial movement of said drum to press said shoe against said surface.

5. A reeling device having a rotatable drum mounted on a threaded shaft for paying out and reeling in a line, and said threaded shaft giving said drum a fleeting motion as it rotates, a spring for rewinding the line on the drum, a braking surface, a brake shoe associated with said drum to retard rotation of the drum when pressed against said braking surface, and pneumatic means actuated by the fleeting motion of said drum to press said shoe against said surface as the line is rewound on said drum.

6. A reeling device having a rotatable drum mounted on a threaded shaft for paying out and reeling in a line, said threaded shaft imparting a fleeting motion to said drum as it rotates, a spring for rewinding the line on the drum, a braking surface, a brake shoe associated with said drum to retard rotation of the drum when pressed against said braking surface, and pneumatic means actuated by the fleeting motion of said drum to press said shoe against said surface as the line is paid out by said drum.

7. A reeling device having a rotatable drum mounted on a threaded shaft for paying out and reeling in a line, said threaded shaft imparting a fleeting motion to said drum as it rotates, a spring for rewinding the line on the drum, a plurality of brake shoes associated with said drum to retard rotation of the drum when pressed against braking surfaces, a pneumatic device actuated by said fleeting motion of the drum in one direction to press one of said shoes against one of said surfaces, and another pneumatic device actuated by said fleeting motion of the drum in the opposite direction to press another of said shoes against another of said surfaces.

8. A reeling device which comprises a fixed shaft having at least a portion that is threaded, a rotatable drum for paying out or reeling in a line mounted on said threaded portion to move in an axial direction as it rotates, cooperating braking members one of which is rotated by said drum and the other of which is stationary, and a pocket formed between said drum and one of said members in which air is compressed to press said members into engagement and thereby retard rotation of the drum as said drum moves in said axial direction.

9. A reeling device as defined in claim 8 having two separate sets of braking members, and separate pockets associated therewith, one of which is actuated by axial movement of the drum in one direction, and the other of which is actuated by axial movement of the drum in the other direction.

10. A reeling device as defined in claim 8 in which an adjustable vent is provided to bleed off a controlled amount of air compressed in the pocket.

11. A reeling device as defined in claim 8 in which the members and air pocket are so constructed and arranged that said members are only pressed into engagement after a predetermined amount of axial movement of the drum.

12. A reeling device which comprises a rotatable drum mounted on a shaft to produce axial movement of the drum as it rotates, brake shoes on each side of the drum arranged to engage a corresponding braking surface, said shoes and surfaces being connected to said drum so as to be given rotary motion relative to each other as said drum rotates, and pneumatic means between said drum and said shoes and surfaces actuated by said axial movement of the drum to force a shoe against its corresponding braking surface on one side or the other of said drum depending upon the direction of said axial movement.

LEROY NIXON.

REFERENCES CITED

The following references are of record in the file of this patent:

UNITED STATES PATENTS

| Number | Name | Date |
|---|---|---|
| 526,679 | Blount | Oct. 2, 1894 |
| 838,169 | Coyle | Dec. 11, 1906 |
| 1,888,912 | Doose | Nov. 22, 1932 |